June 27, 1933.    J. W. MOTHERWELL    1,915,942
ILLUMINATED GAUGE
Filed Oct. 3, 1930    2 Sheets-Sheet 1
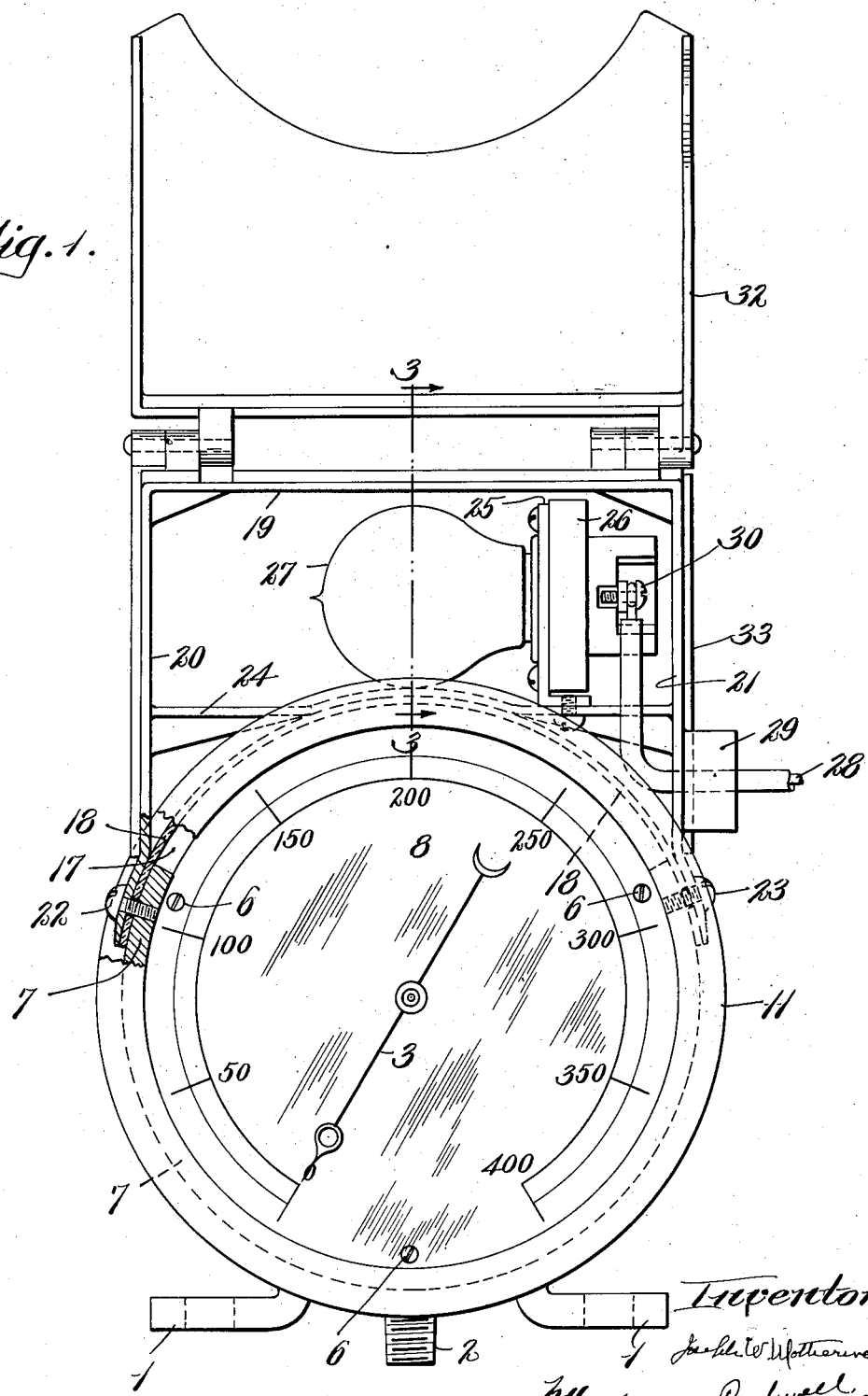

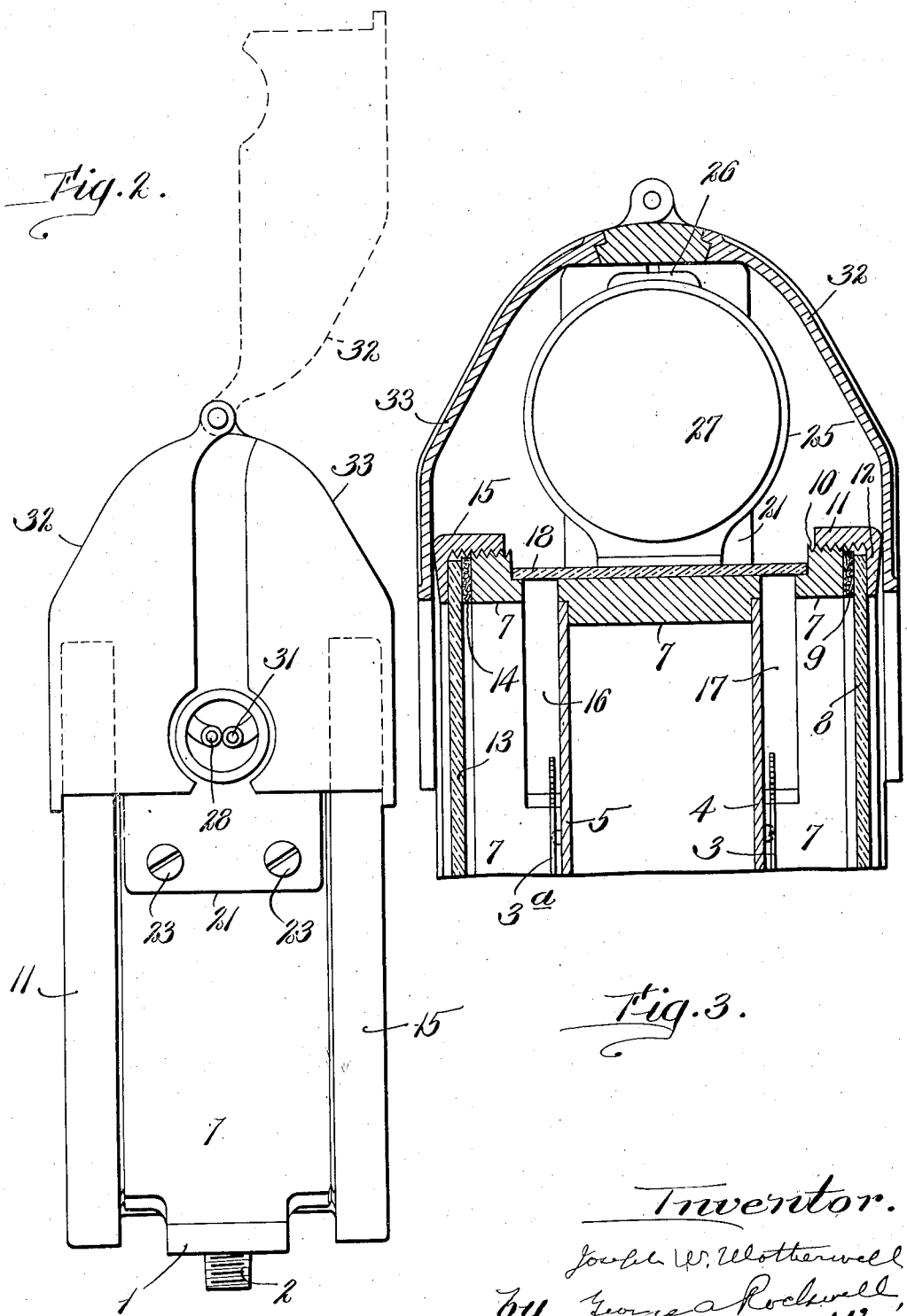

Patented June 27, 1933

1,915,942

UNITED STATES PATENT OFFICE

JOSEPH W. MOTHERWELL, OF MELROSE, MASSACHUSETTS, ASSIGNOR TO THE ASHTON VALVE COMPANY, OF CAMBRIDGE, MASSACHUSETTS, A CORPORATION OF MASSACHUSETTS

ILLUMINATED GAUGE

Application filed October 3, 1930. Serial No. 486,192.

My invention relates to the type of indicating gauge which has a dial illuminated so that the indication may be seen at night, for example.

An object of my invention is to throw the light directly along the face of the dial.

Another object is to provide such direct lighting for a gauge having two dials as, for example, when one is to be visible to the engineer at one side of a locomotive cab and the other visible to the fireman at the other side of the cab.

Other objects and novel features will be pointed out below.

In the drawings

Figure 1 is a front elevation of a gauge embodying my invention, one cover being open;

Figure 2 is a side elevation of the same; and

Figure 3 is a section, on a larger scale, on line 3—3 of Figure 1, both covers being closed.

In the gauge illustrated suitable perforated ears 1 are provided to attach the gauge to a support. Socket 2 is provided for the admission of pressure which, by any suitable mechanism, such as Bourdon tubes, will actuate indicator 3, which moves along the face of dial 4. Suitable mechanism will similarly operate another indicator 3ª, Figure 3, along the face of dial 5. These dials are held, as by screws 6, to the cylindrical casing 7 within which may be suitably located the mechanism for operating the indicators. The ears 1 and socket 2 are suitably attached to the casing 7. A circular glass member 8 to protect the indicator 3 and dial 4 is spaced by annular felt member 9 from casing 7, which has annular threading 10. Annular member 11 has an interior threading to engage the threading 10 and has, as shown, a vertical portion 12 to engage the outer edge of the glass member 8 and when the member 11 is screwed inwardly the glass member 8 will be securely held in place. A similar glass member 13 and felt member 14 are clamped in place by annular member 15, similar to member 11. The casing 7 has an arcuate slot 16 and an arcuate slot 17, these slots being adjacent respectively to dials 4 and 5 and being covered by member 18, which is made of celluloid or other transparent material and which is curved as shown clearly in Figure 1.

A bracket 19 has downwardly extending legs 20 and 21. Screws 22 pass through leg 20 and through one end of member 18 and engage casing 7. Similar screws 23 function in the same way at the other side of the casing.

A bridge member 24 connected at its ends to legs 20 and 21 engages, and aids in holding in place, member 18 covering slots 16 and 17. On this bridge member is suitably mounted a bracket 25 to which is attached lamp socket 26 supporting electric lamp 27. Lead wire 28 conducts electricity through boss 29 on leg 21 to binding post 30 and a similar lead wire 31 leads through said boss to another binding post, not necessary to be shown, on the socket.

The lamp 27 is so located as to throw light through slot 16 and directly along the face of dial 5 and also through slot 17 and directly along the face of dial 4.

Suitably pivoted to the top of bracket 19 are covers 32 and 33. Cover 32 covers one side of the lamp and socket and a portion of annular member 11 and cover 33 covers the other side of the lamp and socket and a portion of annular member 15. When closed these covers fit tightly against said annular members and keep dust and dirt and other extraneous matter away from the lamp and socket and binding posts. They may be so tightly closed because the light passes through said slots and does not have to pass between the lower portions of said covers and said annular members to reach the dials. The covers may be opened separately or together for inspection of the parts or for other purposes.

An important advantage of my gauge is that the light is directed or thrown directly along, and substantially parallel with, the face of the dial which results in much better and clearer illumination.

What I claim is:

1. A gauge comprising two separate dial members, one facing in one direction and the other facing in the opposite direction; a casing around said dials and having two openings; and a single lamp to direct light simultaneously through one of said openings along the face of one of said dials and through the other of said openings along the face of the other of said dials; and two covers pivotally mounted on the gauge, and centrally thereof, on a common horizontal pivot and giving access to said lamp at one side or the other thereof when one or the other of the covers is open, said covers, when closed, being below the pivot and covering said means, and remaining closed by the action of gravity.

2. A gauge comprising two stationary dials, one facing in one direction and the other facing in the opposite direction; two indicators, one cooperating with the face of one dial and the other cooperating with the face of the other dial; a casing for said dials; a slot in said casing adjacent to one of said faces; another slot in said casing adjacent to the other of said faces; and a single lamp to direct light through said slots along the faces of said dials; and two covers pivotally mounted on the gauge, and centrally thereof, on a common horizotal pivot and giving access to said lamp at one side or the other thereof when one or the other of the covers is open, said covers, when closed, being below the pivot and covering said means, and remaining closed by the action of gravity.

3. A gauge comprising a casing; two separate stationary dial members, one facing in one direction and the other facing in the opposite direction; a single lamp to direct light substantially parallel with the faces of both of said dials; and two covers pivotally mounted on the gauge, and centrally thereof, on a common horizontal pivot and giving access to said lamp at one side or the other thereof when one or the other of the covers is open, said covers, when closed, being below the pivot and covering said means, and remaining closed close to the casing by the action of gravity.

JOSEPH W. MOTHERWELL.